July 29, 1969   F. K. NONNENMACHER ET AL   3,457,989
SCREW CONVEYOR
Filed Feb. 15, 1967  2 Sheets-Sheet 1
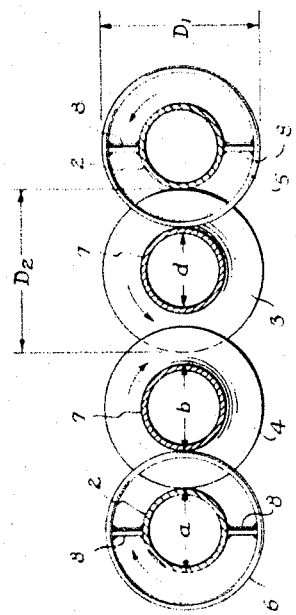
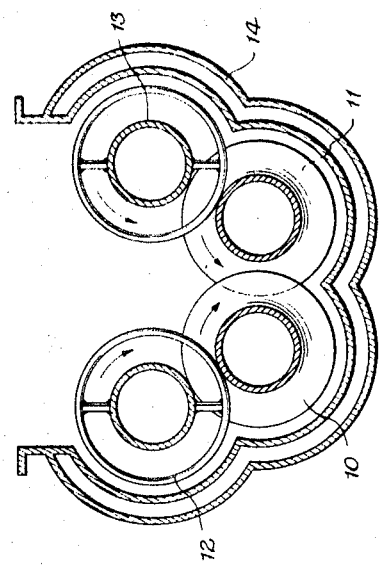
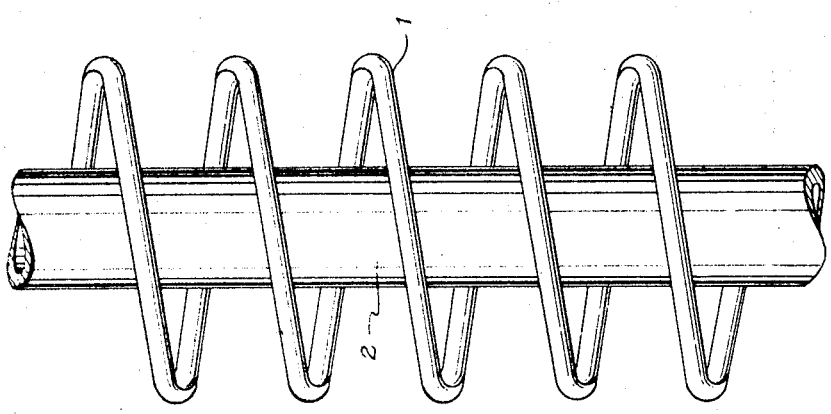
INVENTORS
Friedrich Karl Nonnenmacher
Rudolf Schäfer
BY
Bailey, Stephens and Huettig
ATTORNEYS

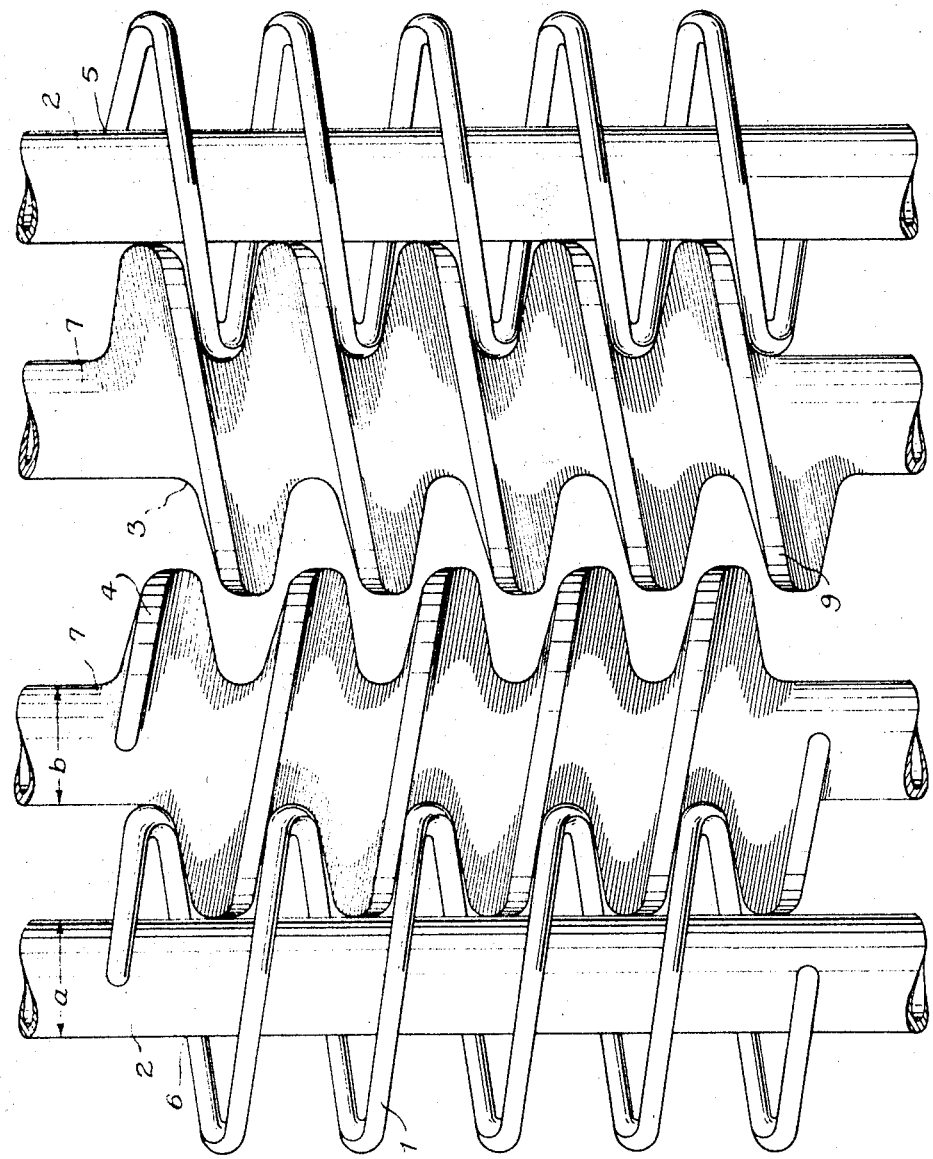

United States Patent Office 3,457,989
Patented July 29, 1969

3,457,989
SCREW CONVEYOR
Friedrich Karl Nonnenmacher, Frankfurt am Main, and Rudolf Schafer, Coesfeld in Westfalen, Germany, assignors to Metallgesellschaft Aktiengesellschaft Frankfurt am Main, and B. Thies Spezialmaschinenfabrik, Coesfeld in Westfalen, Germany
Filed Feb. 15, 1967, Ser. No. 616,293
Claims priority, application Germany, Feb. 25, 1966, M 68,525
Int. Cl. F28f 5/06
U.S. Cl. 165—87                    4 Claims

ABSTRACT OF THE DISCLOSURE

The screws of a screw conveyor are engaged by parallel extending coils for cleaning the screws of the material being conveyed.

---

Conventional screw conveyors exist which have a pair of parallel screws. These conveyors are used for the mixing, kneading, pressing and conveying of flowable materials, such as granular, plastic, paste-like or liquid materials. These conveyors are also used for the cooling, heating or drying of materials, and in which case, the screw shafts are hollow and mounted in a double-walled housing so that a heat exchange medium can flow through the hollow shafts and the walls of the housing. The volatile components of plastic, elastic or viscous materials are vaporizable in such conveyors.

In these conveyors, the screws in a pair of screws engage one another and rotate in the same direction. When two pairs of screws are used, they rotate counter to each other. The screws are arranged so that the innermost screw of the pairs, when seen in cross-section, touch on the outside diameter.

A screw conveyor serving as a heat exchanger has been suggested in which the hollow screw shafts are arranged so that two pairs of screw shafts are formed with the shafts of the screws of one pair rotating in the same direction and having the same number of blades which engage one another over the entire depth of the blades and with the screws of the other pair rotating in the opposite direction. These screws rotating in the opposite direction are only engaged over a portion of the depth of the blades.

The screws which are adjacent one another and rotating in the opposite direction are used to convey the material. The screws which are in engagement with these screws are used to clean the screws conveying the material. This cleaning is done during the rotation of the screws so that the blade of one screw slides along the sides of the blades of the other screw rotating in the same direction with substantially no clearance between the two. The blades of the material conveying screw, in turn, slides along the sides of the blade of the cleaning screw and thereby peals the material off the blade of the material screw.

The screws are produced by welding, casting or stamping. In any case, the fabrication is awkward and expensive.

SUMMARY OF THE INVENTION

In this invention, it has been found that it is possible to reduce production costs for the screws by replacing the cleaning screws with helical coils mounted on shafts and arranged with respect to the material conveying screws so that the material scraped from the screw blades falls back into the conveying screws.

Such cleaning coils can be more simply fabricated than solid screws and are thus substantially less expensive. Rods or tubes of steel or any other suitable metal are wound on a cylindrical form of the desired diameter for making the coils. The coil thus formed is removed from the cylinder and attached to the shaft by means of struts. The cross-section of the rod or tube used for the coil is selected as required. Tubes having a circular, square or rectangular cross-section can be used in making the coils.

If desired, the coils having a rectangular or square cross-section can be provided with adjustable scrapers made of a material resistant to wear and tear. This permits a certain variation of the size of the space between the screw and coil. Such may be required when the material being conveyed is changed without having to change the position of the coils or the screws. These scrapers are simple and made of short pieces movably attached to the coil so that they touch one another or are slightly spaced, as, for example, being screwed to the coil. By adjusting the scrapers, the distance between the edge of the scraper and the side of the blade can be changed with regard to the material conveying screw which must be cleaned.

The means by which the objects of the invention are obtained are described more fully with reference to the accompanying drawings in which:

FIGURE 1 is a plan view of a coil mounted on a shaft;
FIGURE 2 is a plan view of a pair of conveying screws with their associated cleaning coils;
FIGURE 3 is a schematic cross-sectional view taken through FIGURE 2; and
FIGURE 4 is a schematic cross-sectional view through a screw conveyor according to this invention.

As shown in FIGURE 1, a helical coil 1 is attached to a shaft 2. This attachment is made by the use of struts which do not appear on FIGURE 1 because they are obscured by the coil 1 and the shaft 2.

FIGURES 2 and 3 show two screws 3 and 4 which partially engage one another. The screw 3 is geared to rotate counterclockwise while screw 4 is geared to rotate clockwise. These screws 3 and 4 are cleaned by the coils 5 and 6, respectively. Coil 5 is engaged with screw 3 over the entire depth of the screw blade and is geared to rotate counterclockwise in the same direction as screw 3. Likewise, coil 6 is geared to rotate clockwise in the same direction as screw 4.

When the direction of shaft rotation is changed, the direction of the movement of the conveyed material is also changed.

The diameter $b$ of screw shaft 7 and the diameter $a$ of coil shaft 2 are the same in the example shown. Therefore, $a$ equals $b$. In the example shown the diameters $b$ of the shafts 7 are also equal to the inner diameter $d$ of the screws 3 and 4. The outer diameter $D_1$ of coils 5 and 6 and the outer diameter $D_2$ of screws 3 and 4 are also the same in the example shown.

FIGURE 3 shows the struts 8 attaching the coils to their respective shafts. Usually three struts 8 are used for one convolution of the coil. However, it is possible to use more or less struts per convolution for mounting the coil on its shaft.

The convolutions of coil 1 describe a curve in space. As shown in FIGURES 2 and 3, the space curve of coil 5 coincides with the space curve which is formed by the helical blades 9 on the screw 3. The same is true for the coil 6 with regard to screw 4.

In practice, the coils are positioned with respect to the screws so that the material pealed off the screws always falls back onto the screws and conveyed along by the screws. This means that the coils are arranged above the screws. As shown in FIGURE 4, a screw conveyor is so constructed. The material conveying screws 10 and 11 rotating in opposite directions are in a lower plane. The coils 12 and 13 are positioned above this plane. The axes of screws 10 and 11 and the axes of coils 12 and 13 lie in the corners of a trapezoid which is open toward the top. The conveyor housing has double walls 14. The conveyor cover, not shown, has an opening for feeding the material to the conveyor. Also not shown is a discharge opening at the other end of the housing and the driving mechanism for the screws and coils positioned at the frontal end of the housing.

Screws 10 and 11 rotating in opposite directions draw the material into the intermediate space between the screws. The coils 12 and 13 clean the blades of the conveying screws of material which sticks to the blades. The coils are in engagement with the screws so that they rotate in the same direction as their respective screws. The fact that the rotating coils slide along the sides of the screws means that the material sticking to the blades is scraped off. This scraped off material falls back onto screws 10 and 11 and is thus conveyed toward the discharge end of the conveyor. Depending upon the rheological characteristic of the material being treated, the space between the coil 12 or 13 and its respective shaft becomes more or less completely filled with the material so that, after some time, the coils in effect become screws formed of the coil 1 and the material being treated.

It has been surprisingly found that in many cases, as, for example, when conveying clay, kaolin, azo coloring substances and other materials in the conveyor of this invention, it is possible to achieved practically the same satisfactory treatment results as when screws are used for cleaning.

When both the coils 1 and the shafts 2 are hollow, then, by suitable connections, a heat exchange medium can be passed through the coils and shafts.

When a high temperature heat exchange medium flows through the screws, then the same temperature medium must flow through the coils so that the screw and coil do not jam together because of an unequal change in length due to thermal expansion.

It is not necessary that the diameters $b$ of the screw shafts 7 are the same as the inner diameters $d$ of the screws 3 and 4. As a rule, the diameter $a$ of the coil shaft 2 is chosen to be the same as the inner diameter $d$ of its respective screw. However, it is possible that the diameter $a$ of a coil shaft 2 is smaller than the inner diameter $d$ of the respective screw. Also, the outer diameter $D_1$ of a coil and the outer diameter $D_2$ of its respective screw need not be the same. It is also possible to use a screw having one helical blade and which is engaged by a plurality of coils and vice versa. It is not necesary that the material conveying screws rotating in opposite directions partially engage one another. They can be arranged, when seen in cross-section, so that they touch each other only on the circumference. Also, the coils can be mounted above the screws so that their axes form the corner of a rectangle or a square.

Having now described the means by which the objects of the invention are obtained, we claim:

1. A screw conveyor comprising a housing, at least two helically bladed screws mounted on screw shafts parallel to each other in said housing and being adapted to rotate in opposite directions for conveying material between the screws, and a coil for each bladed screw mounted on and spaced from its coil shaft and rotatable in the same direction as its bladed screw, respectively, and in engagement therewith over the entire depth of the blades on said screws for cleaning said screws of the material being conveyed.

2. A conveyor as in claim 1, said coil means comprising coils mounted above and parallel to each of said screws so that material scraped from said screws drops back onto said screws.

3. A conveyor as in claim 2, said screws having hollow shafts, and said coils being hollow, both for the circulation of a heat exchange medium therethrough.

4. A conveyor as in claim 3, further comprising scraper means mounted on said coils.

References Cited

UNITED STATES PATENTS

| | | | |
|---|---|---|---|
| 1,086,629 | 2/1914 | Valerius | 165—87 |
| 1,158,592 | 11/1915 | Valerius | 165—87 |
| 2,989,289 | 6/1961 | Christian | 165—86 |
| 3,255,814 | 6/1966 | Zimmerman et al. | 165—87 |
| 3,263,748 | 8/1966 | Vemal et al. | 165—87 |

ROBERT A. O'LEARY, Primary Examiner

T. W. STREULE, Assistant Examiner